Patented Apr. 22, 1941

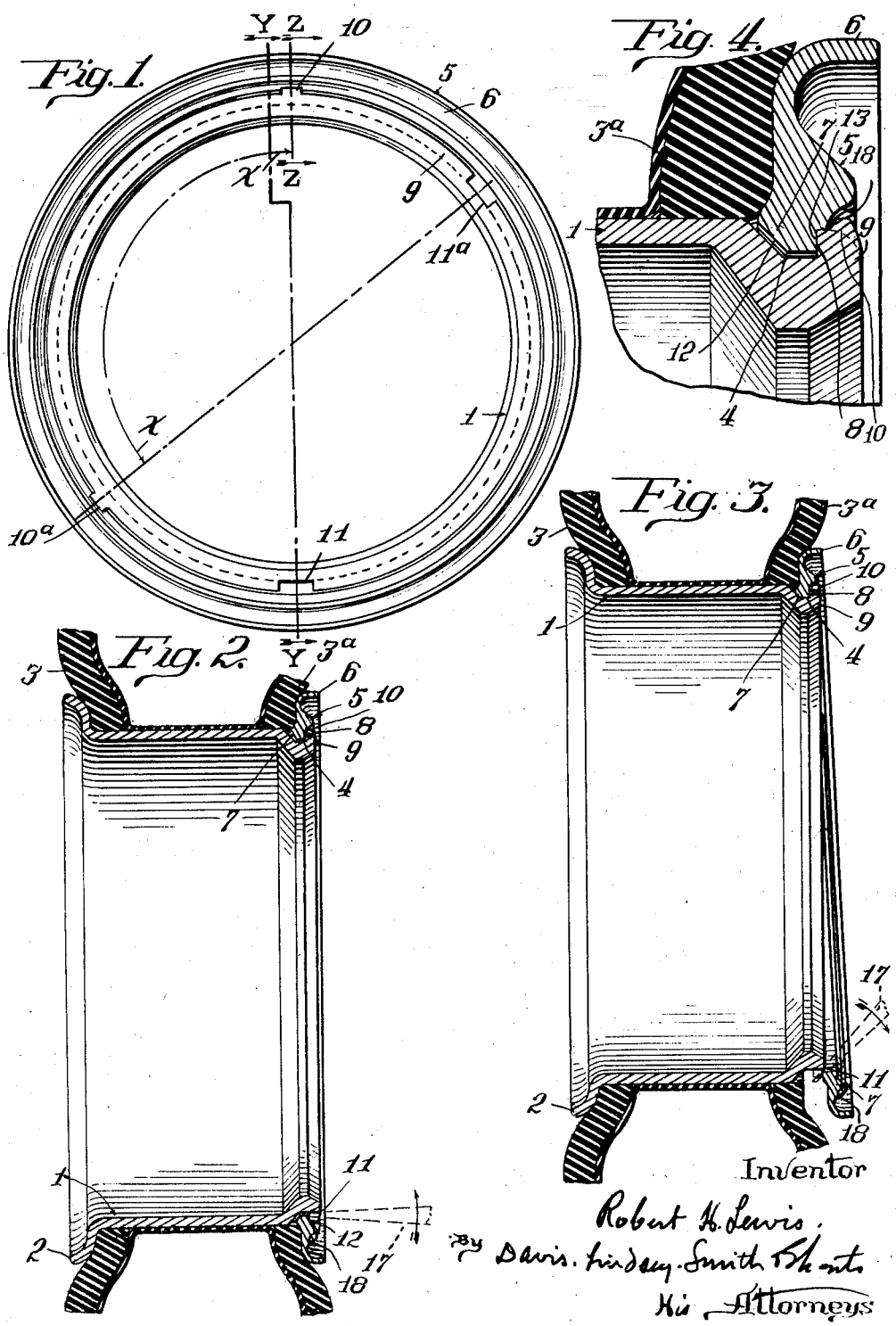

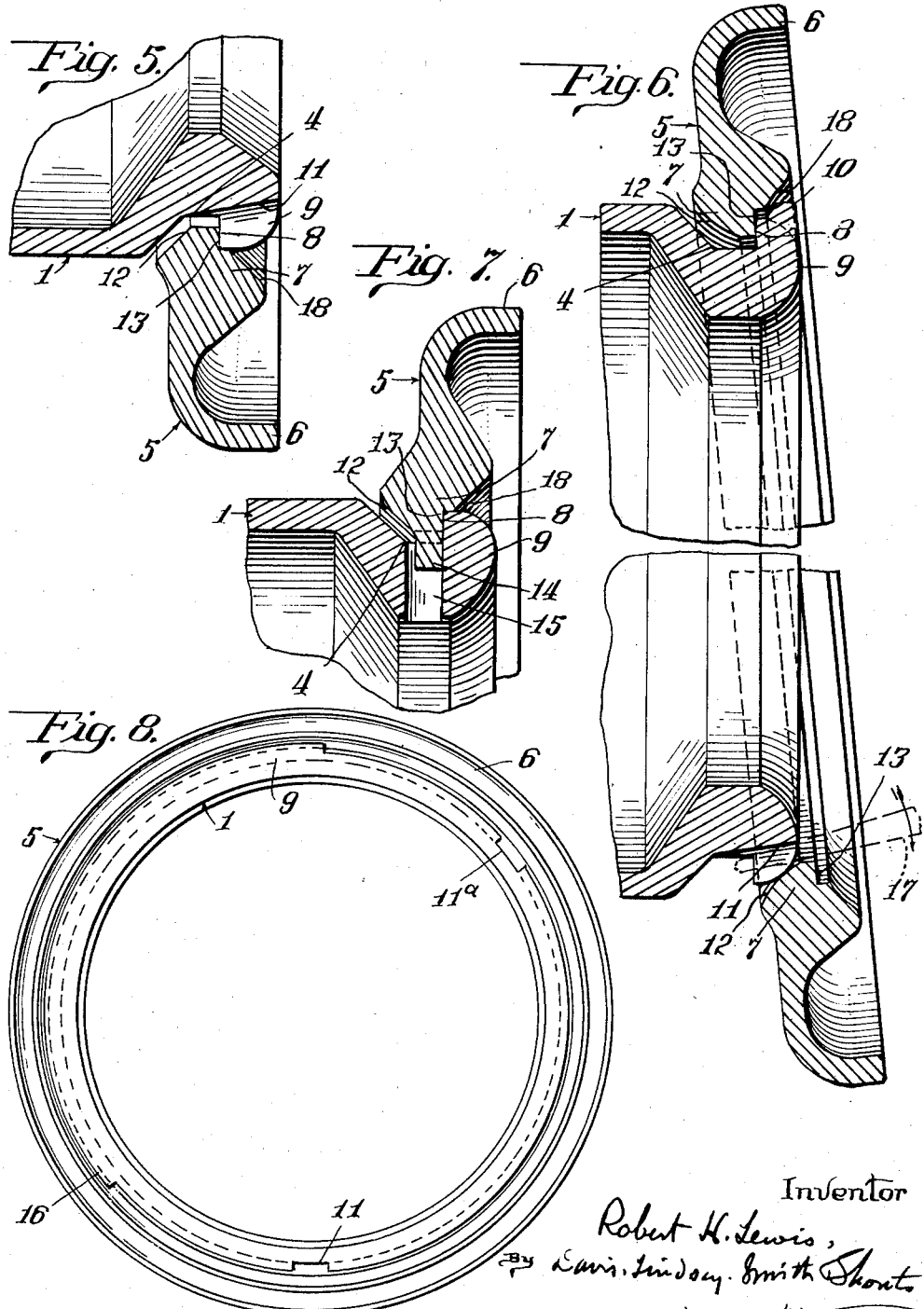

2,239,504

UNITED STATES PATENT OFFICE 2,239,504

WHEEL RIM FOR PNEUMATIC TIRES

Robert H. Lewis, Chicago, Ill.

Application September 14, 1939, Serial No. 294,811

7 Claims. (Cl. 152—411)

My invention relates to means for detachably securing pneumatic tires to the rims of vehicles, and more particularly to the type of such rims in which the base member of the rim is formed with a gutter at one side arranged to receive an endless side ring member which is so formed as to provide an outer seating flange forming a retainer for one bead or foot of the tire casing and an inner engaging portion which is of such diametrical dimensions with respect to the outer wall of the rim gutter that when assembled and forced to concentric position by pressure of an inflated tire the outer face of said inner engaging portion of the ring will overlap a portion of the inner side face of the outermost wall of the gutter of the rim, thus providing an annular locking engagement of the overlapping faces of the outer gutter wall and the opposed face of the side ring.

To permit assembly of the parts it is necessary that the gutter be of such depth that the engaging, inner portion of the side ring, tilted for the purpose, may be received within the gutter, while the opposite side of the ring extends radially outside the gutter, it being understood that the tire on the rim inside the ring is at the time deflated. The ring is so made as to have some degree of flexibility and resiliency, so that it may be sprung slightly out of round, permitting the edge of the ring to be worked down by appropriate implements all the way around under the outer wall of the gutter, and so that when finally entirely seated in the gutter it will spring back into circular shape, and be centered by inflation of the tire.

In the application of tires and side rings to rims of this type, considerable difficulty in seating the ring member is sometimes encountered, due to the fact that as the rings are distorted to elliptical shape and force is applied to the outside portion of the ring adjacent one of its points of contact with the outer wall of the rim gutter to force it underneath and past the outer edge of such wall, the ring, at its point of contact with the gutter wall at the other side of the wheel, has a tendency to tilt upwardly and slide out of the rim gutter at such opposite side so that as the ring at the point of contact at one side of the wheel is worked into the gutter the ring adjacent the opposite point of contact tends to ride upwardly out of the gutter and the point of contact recedes, due to a slippage which occurs between the parts. It is to obviate this difficulty that my present invention has been devised, to which end I have provided means for positively holding down the ring inside the rim gutter, thus preventing the engaged portion from slipping out of engagement. My invention, therefore, consists in the construction and arrangement of stop means carried by the rim base (or the side ring member), as hereinafter described, which I have devised for attainment of the end in view, the essential elements of my invention being more particularly pointed out in the appended claims.

In the drawings, Figure 1 is a side view of the rim and side ring of a wheel embodying my invention in a preferred form;

Fig. 2 is a diametrical section of the same in a plane indicated by the offset dotted line Y—Y of Fig. 1;

Fig. 3 is a diametrical section similar to Fig. 2, but with the side ring detached, and in position ready for application to the rim;

Fig. 4 is an enlarged detail in section of parts in a plane indicated by the dotted line Z—Z of Fig. 1, looking in the direction of the arrow, and showing the arrangement of the stop lug on the rim;

Fig. 5 is an enlarged detail in section of parts in the plane Y—Y of Fig. 1, showing the construction of the notch in the rim gutter at the lower part of said Fig. 1;

Fig. 6 is an enlarged cross-sectional detail, broken away at the center and corresponding to Figs. 4 and 5, but showing a slightly modified form of rim and side ring members; with the ring disengaged from the rim at the bottom of the figure;

Fig. 7 is an enlarged detail showing in cross-section a modified form of construction in which the stop lug is formed on the side ring member, instead of on the base member of the wheel rim as in the preferred form; and Fig. 8 is a modified form of my invention in which the pair of lugs shown in Fig. 1 are omitted and replaced by an arcuate, outwardly extending continuous flange on the rim member.

Like reference characters indicate like parts in all the figures of the drawings.

It will be understood that the base member 1 of the rim is rigidly secured to the hub and disk or felly portion of the wheel in any appropriate manner. The rim member is, in the present instance, of the type in which the base of the rim is provided at one side—in common practice, the inner side—with an integral flange 2 shaped to provide a seat for the inner foot or base portion 3 of the casing of the pneumatic tire which the rim is adapted to receive, and is formed at the opposite side with a gutter portion 4 adapted to receive the side ring member 5 of the wheel, the ring member being formed with a peripheral flange portion 6 providing a seat for the opposite outer foot or base 3ª of the tire, and an engaging inner portion 7 adapted to be received within the rim gutter, and when centrally disposed make engagement with the inner face 8 of the outer wall 9 of the gutter entirely around the wheel.

It is, of course, understood that, like all tire rims of this type, the gutter is of such depth as to permit distortion of the side ring to a degree sufficient to enable the ring, which is initially seated in tilted eccentric position, to be worked down into such gutter entirely around the rim.

The outer wall 9 of the rim gutter is provided with a pair of outwardly extending lugs 10—10ª, which, in the present instance, are integral therewith though they may be separately formed and secured thereto in any suitable manner. These lugs are spaced a substantial distance apart, preferably just within the points of contact between the peripheral edge of the outer wall of the gutter and the inner edge of the ring when the latter is slightly tilted and drawn into the gutter in the arc, marked x—x in the drawings, between said lugs. In the present instance these lugs are arranged about 130 degrees apart, though this distance may vary in accordance with the varying cross-sectional shape and dimensions of the rim base and side ring members of the rim.

Diametrically, or approximately diametrically opposite one of the lugs, as the lug 10, the outer gutter wall 9 of the rim is formed with a notch or gap 11, for convenient application of a hand prying tool 17, the working end of which is shown in dotted lines in Figs. 2, 3 and 6. In the present instance the gutter wall 9 is also formed with another notch, marked 11ª, opposite the lug 10ª, so the prying tool may be applied to either notch in assembling the members, as may be most convenient for the operator, and additional notches may be provided, if desired, to facilitate the assembling and disassembling operations.

In installing a tire upon a rim, the rim may conveniently be laid down in horizontal position, with the flange 2 down, and a deflated tire surrounding the rim then applied. The side ring is then hooked under the lugs 10—10ª, the inner edge of the engaging portion 7 of the ring lying within the tire gutter along the arc x—x between said lugs, and the remainder of the edge of the engaging portion lying outside the outer wall of the rim.

The prying tool is then applied to the notch 11 (or 11ª, if more convenient) and the ring at the point of application is drawn forcibly outward and at the same time forced downward. This distorts the ring, drawing the portion of it adjacent the tool outward so that the portion of the edge of the ring along a zone extending from the nearest lug to a point approximately the same distance on the opposite side of the tool is free to clear the edge of the rim gutter and can be pried down into the gutter along this zone. Meanwhile the portion of the ring within the arc between the two lugs cannot escape or creep out of the gutter, as any tendency to creeping is wholly stopped by the side faces of the lugs extending radially outward past the point at which slippage could otherwise occur. The greater portion of the engaging portion of the ring having thus been worked into the rim gutter, the force required to crowd the remaining portion back over the gutter wall into the gutter is slight, and may be accomplished by manual pressure or tapping the ring lightly with a hammer, the ring springing back to circular shape within the gutter when this is accomplished.

It is obvious that if the prying tool is applied to the notch 11ª, the ring may be worked into the groove in the manner described but in a direction opposite to that which is brought about by employing the notch 11.

The seating of the ring in the rim gutter is facilitated by an inner inclined face 12 of the inner portion 7 of the ring, opposite the inner engaging side face 13 of such portion, as will be understood by reference to Figs. 4, 5 and 6.

Upon inflating the tire, the inclined outer face 18 of the ring cooperates with the outer edge of the inner face 8 of the outer wall 9 of the gutter to automatically center the ring 5, the ring member being formed, between the faces 13 and 18, with a narrow cylindrical face which fits closely over the peripheral face of the gutter rim at the outer edge of the inner face 8 of the outer gutter wall.

In the form of my invention illustrated in Fig. 7, the lugs 10—10ª on the outer wall of the rim gutter are omitted, and the inner engaging portion of the side ring is formed with a pair of inwardly extending lugs, spaced apart angularly as are the lugs 10—10ª of the form of my invention above described, one of which lugs, marked 14, is shown in said Fig. 7. To provide clearance, orifices 15 are provided in the rim to receive the lugs, and the latter are of such length that their lower ends will remain engaged in the orifices and serve as stops even though the inner faces of the rings may clear the peripheral face of the outer wall of the rim and would otherwise tend to creep out of the gutter.

In the construction shown in Fig. 8, the functions of the lugs 10—10ª are performed by the opposite ends of a continuous outwardly extending flange 16 formed on the periphery of the outer wall of the rim and which extends throughout an arc corresponding to the angular distance apart of such lugs. Obviously, the lugs 10 of the preferred form of my invention, and the lug or lugs 14 illustrated in Fig. 7, and the shouldered ends of the flange 16 shown in Fig. 8, all function in the same manner as stop bodies serving to prevent escape of the edge of the side ring member from its engagement back of gutter wall 9 of the rim member of the wheel.

While I have described and illustrated two stop lugs 10 and 10ª, and both are desirable as facilitating the placement of the side ring in proper relation to the notches and in positively restraining the portion of the side ring between them from disengagement, it will be understood that the lug opposite the point of application of the prying tool is the important one in restraining slippage of the ring out of the rim gutter at the opposite side of the rim, and I therefore regard the provision of a single stop body only as coming within the broader scope of my invention.

It is, of course, understood that the ring is removed from the rim, after deflation of the tire, by manipulating the prying tool in the opposite direction, to spring the ring out of round and pry the ring on the side of the rim adjacent the tool outside the gutter rim. The ring may then be disengaged by a reversal of the manipulation used in applying the ring.

I claim:

1. A wheel rim comprising a base member formed at one side with a gutter having its outer wall formed with an annular inner engaging face, and a resilient endless side ring member having an outer tire-retaining flange and an inner portion seated in said gutter and formed with an annular outer side face engaging said inner engaging face of the gutter wall, the internal diameter of said ring member being less than the diameter of the periphery of the outer wall of the gutter of said base member, said outer gutter wall being provided with means for facilitating the mounting of said side ring member including a stop body on said gutter wall extending outwardly therefrom beyond the line of its periphery.

2. A wheel rim comprising a base member formed at one side with a gutter having its outer wall formed with an annular inner engaging face, and a resilient endless side ring member having an outer tire-retaining flange and an inner portion seated in said gutter and formed with an annular outer side face engaging said inner engaging face of the gutter wall, the internal diameter of said ring member being less than the diameter of the periphery of the outer wall of the gutter of said base member, the gutter of said rim and said ring member being provided with means for facilitating the mounting of said ring member consisting of a radially disposed stop body on one of said members extending past the periphery of the other member and arranged to block disengagement of the side ring member from the rim gutter.

3. A wheel rim structure as recited in claim 1 in which the recited stop body on the gutter wall is an integral projecting lug.

4. A wheel rim comprising a base member formed at one side with a gutter having its outer wall formed with an annular inner engaging face, and a resilient endless side ring member having an outer tire-retaining flange and an inner portion seated in said gutter and formed with an annular outer side face engaging said inner engaging face of the gutter wall, the internal diameter of said ring member being less than the diameter of the periphery of the outer wall of the gutter of said base member, said outer gutter wall being provided with means for facilitating the mounting of said side ring member including an outwardly extending arcuate flange of less than a semicircle in extent providing at its opposite ends stop faces arranged to block disengagement of the side ring member from the rim gutter.

5. A wheel rim comprising a base member formed at one side with a gutter having its outer wall formed with an annular inner engaging face, and a resilient endless side ring member having an outer tire-retaining flange and an inner portion seated in said gutter and formed with an annular outer side face engaging said inner engaging face of the gutter wall, the internal diameter of said ring member being less than the diameter of the periphery of the outer wall of the gutter of said base member, said ring member being formed with an inwardly extending lug and the lower wall of said rim gutter being orificed to receive said lug, and said lug and orificed rim gutter being arranged to block disengagement of said side ring member from said rim gutter.

6. A wheel rim comprising a base member formed at one side with a gutter having its outer wall formed with an annular inner engaging face, and a resilient endless side ring member having an outer tire-retaining flange and an inner portion seated in said gutter and formed with an annular outer side face engaging said inner engaging face of the gutter wall, the internal diameter of said ring member being less than the diameter of the periphery of the outer wall of the gutter of said base member, said outer gutter wall being provided with means for facilitating the mounting of said side ring member including a pair of stop lugs on said gutter wall extending outwardly therefrom beyond the line of its periphery and spaced substantially less than a semicircle apart from each other.

7. A wheel rim comprising a base member formed at one side with a gutter having its outer wall formed with an annular inner engaging face, and a resilient endless side ring member having an outer tire-retaining flange and an inner portion seated in said gutter and formed with an annular outer side face engaging said inner engaging face of the gutter wall, the internal diameter of said ring member being less than the diameter of the periphery of the outer wall of the gutter of said base member, said outer gutter wall being provided with means for facilitating the mounting of said side ring member including a pair of stop lugs on said gutter wall extending outwardly therefrom beyond the line of its periphery and spaced substantially less than a semicircle apart from each other, said gutter wall being also formed with a tool-receiving notch arranged opposite one of said stop lugs.

ROBERT H. LEWIS.